Figure 1:
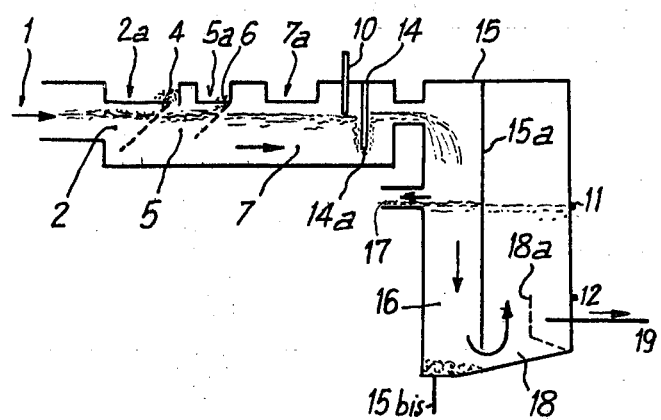

United States Patent [19]

Vellas

[11] 4,304,648

[45] Dec. 8, 1981

[54] PROCESS FOR THE TREATMENT OF LIQUIDS BY OLIGODYNAMY AND PARTICULARLY THE TREATMENT OF SULLAGE WATERS

[75] Inventor: Jean L. Vellas, 1, rue Saint-Aubin, 31000 Toulouse Haute-Garonne, France

[73] Assignees: Jean Leon Justin Vellas; Lorenzo Casanovas Puig; Francois Marie Jacques Du Lac, all of Toulouse, France

[21] Appl. No.: 62,235

[22] Filed: Jul. 27, 1979

[30] Foreign Application Priority Data

Jul. 27, 1978 [FR] France ............................ 78 22269

[51] Int. Cl.³ ............................ C02F 1/46; C02F 1/50
[52] U.S. Cl. ............................ 204/149; 204/DIG. 13
[58] Field of Search ....... 204/149, 151, 152, DIG. 13; 210/139, 62, 64, 169

[56] References Cited

U.S. PATENT DOCUMENTS

| 2,046,467 | 7/1936 | Krause | 204/149 X |
| 2,882,210 | 4/1959 | Jenks | 204/151 |
| 4,048,032 | 9/1977 | Eibl | 204/151 |

Primary Examiner—Howard S. Williams
Attorney, Agent, or Firm—Browdy and Neimark

[57] ABSTRACT

The invention concerns a method of treating liquids by means of oligodynamy, particularly of sullage waters. The waters are passed between metal electrodes supplied with electric current before being allowed to settle. The waters which have been subjected to the oligodynamic treatment are then submitted to at least one positive degassing operation and/or a part at least of the flocculate being formed is recovered and said flocculate is re-introduced into the water which has just flowed between the metallic electrodes. The flocculate resulting from the treated waters is then separated.

16 Claims, 9 Drawing Figures

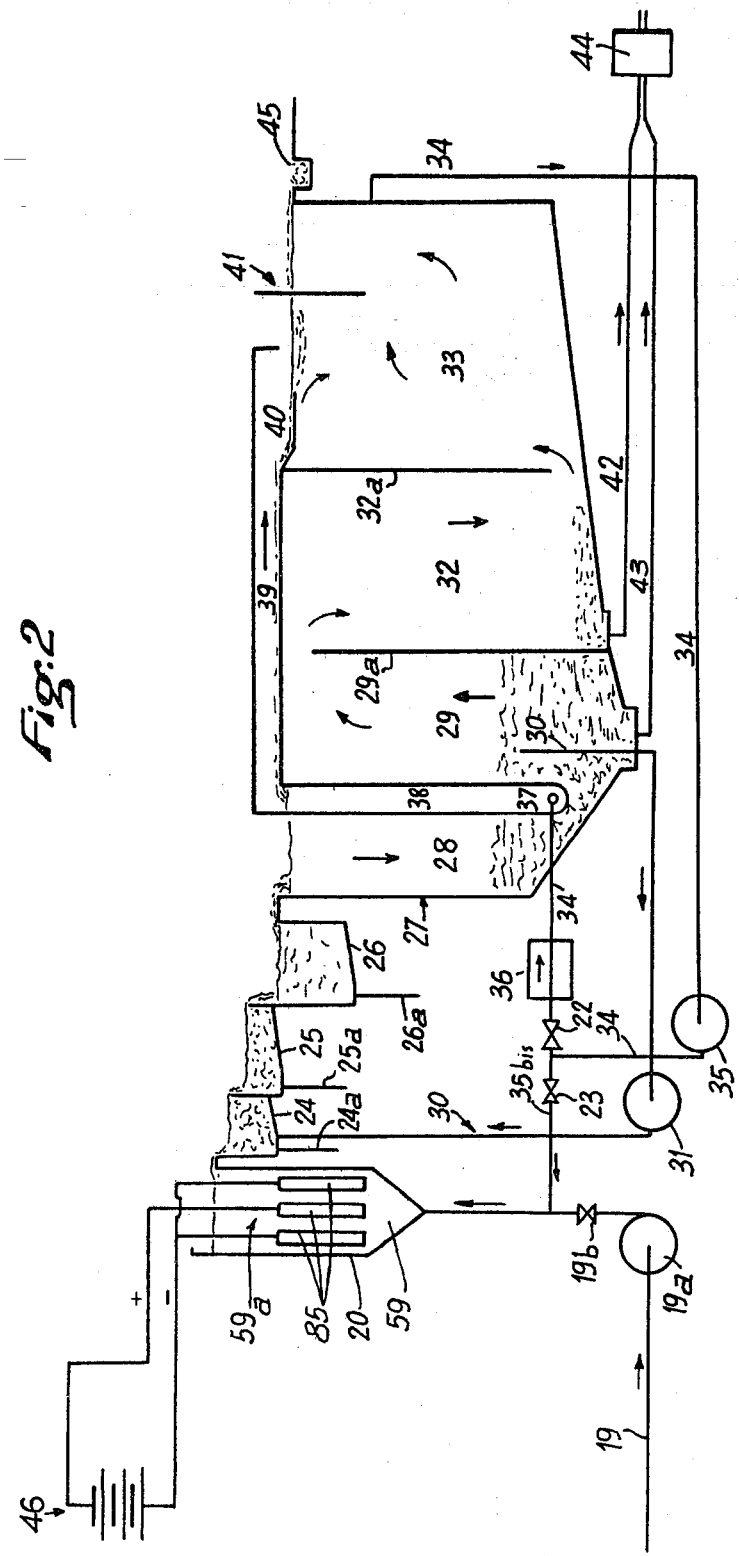

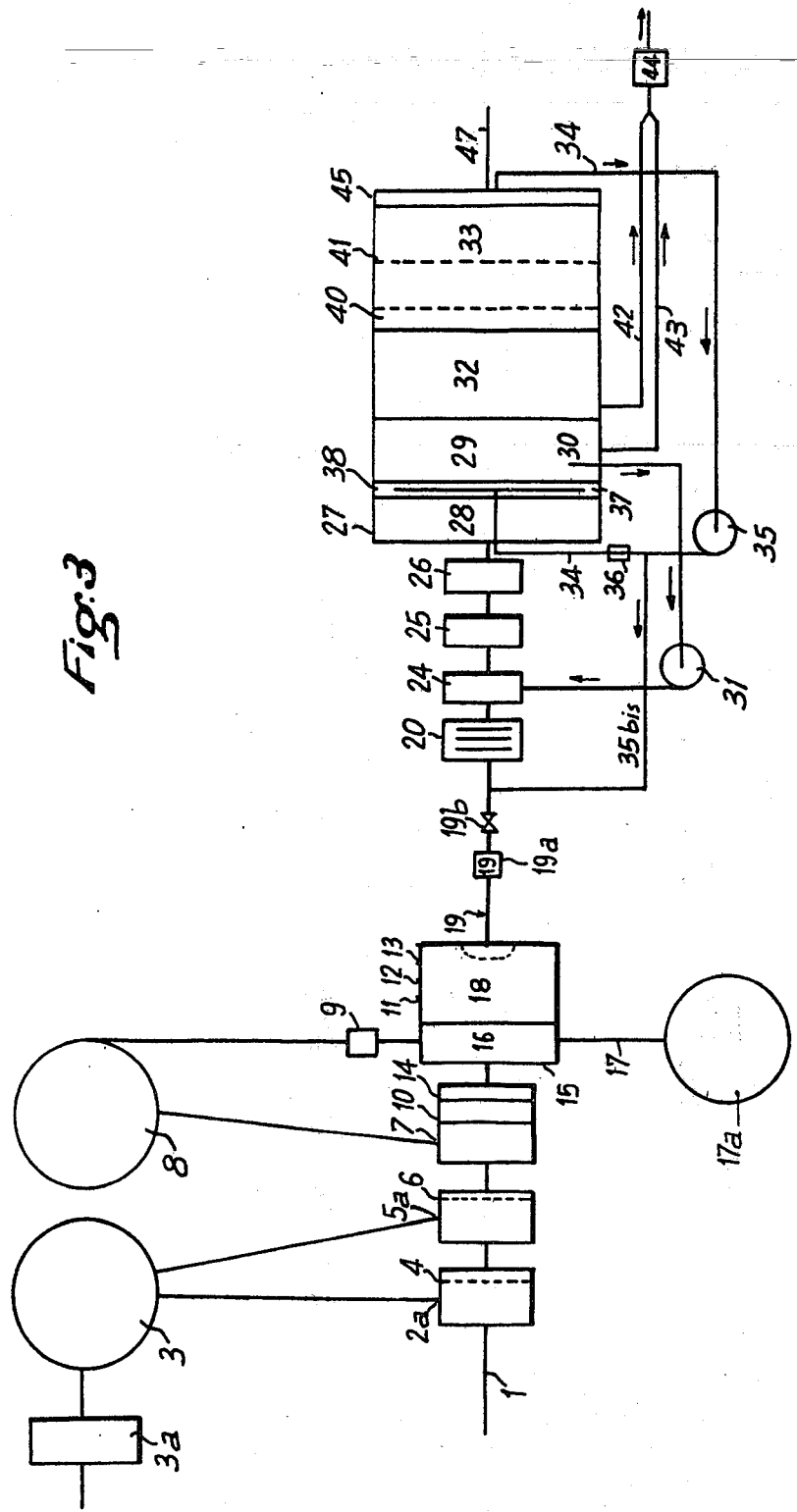

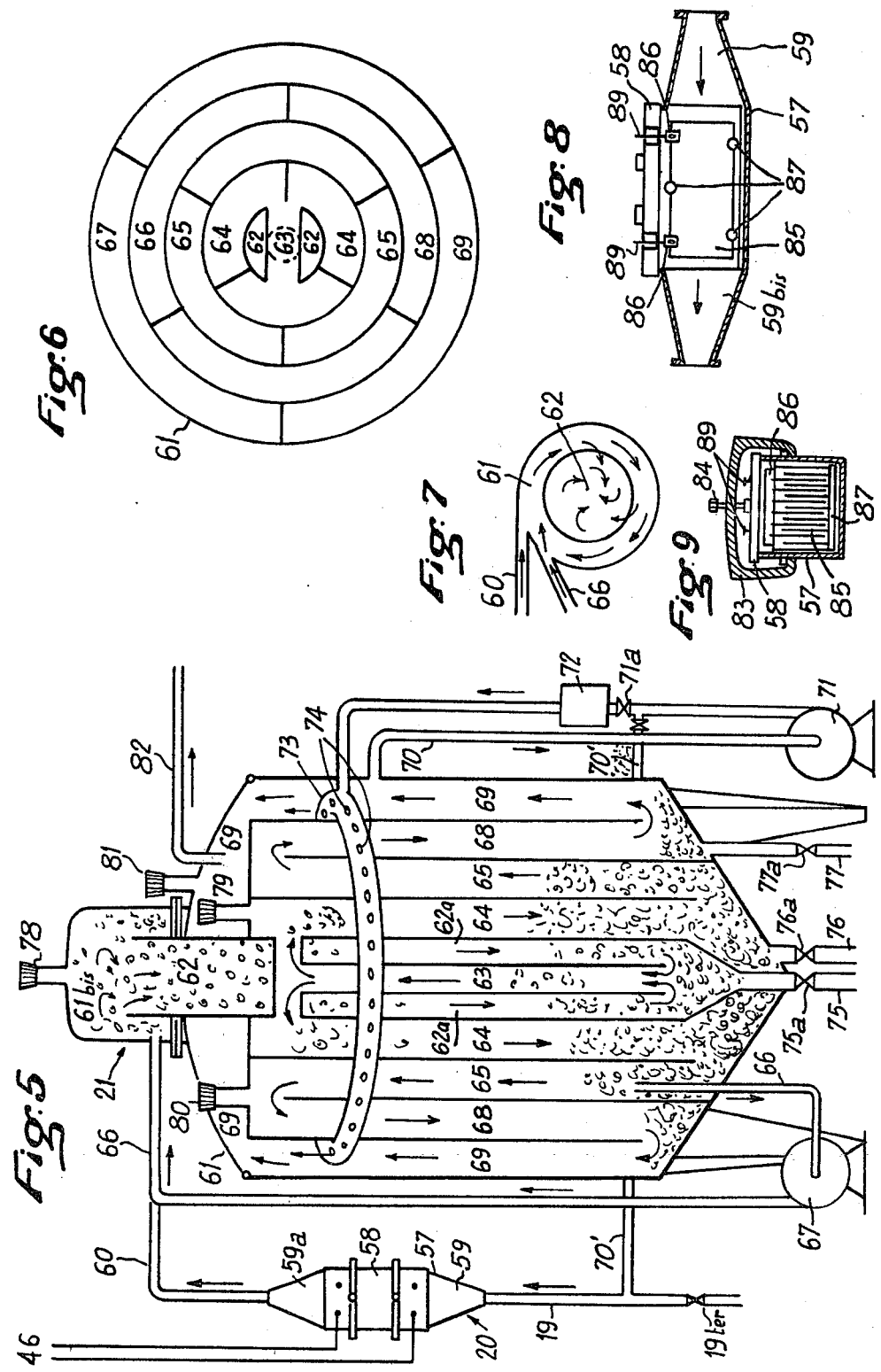

PROCESS FOR THE TREATMENT OF LIQUIDS BY OLIGODYNAMY AND PARTICULARLY THE TREATMENT OF SULLAGE WATERS

The present invention relates to the treatment of liquids by means of oligodynamy, and particularly the treatment of sullage waters.

The invention is applicable to waters of most various natures such as sewage or industrial evacuation waters. Particularly, the invention has a very interesting application in the treatment of waters containing various metallic salts which could be toxic, such waters having to be filtered before reuse or before simply releasing into a river.

The invention can be operated in the open air and at atmospheric pressure or, on the contrary, it can be practiced very simply for the treatment of waters under pressure which have to be free from contact with the atmosphere.

Thus, the invention makes possible a treatment of radio-active waters or waters containing dangerous volatile products.

According to the invention, the method for treating liquids by oligodynamy, particularly of sullage waters where the waters are passed between oligodynamically active metal electrodes before being allowed to settle, is characterized in that the waters which have been subjected to the oligodynamic treatment are submitted to at least one positive degassing operation, and/or a part at least of the flocculate being formed is recovered and said flocculate is re-introduced into the water which has just flowed beteeen the metal electrodes, and then the flocculate resulting from the treated waters is separated.

According to further features of the invention, oxygen is added to the waters separated from the flocculate and the discharge of ions from the electrodes is also set as a function on the one hand, of the nature of the metals forming them, and on the other hand of the characteristics of the processing electrodes so that the electrode metal reacts with the metals and metallic salts contained in the treated waters.

Figure 4:
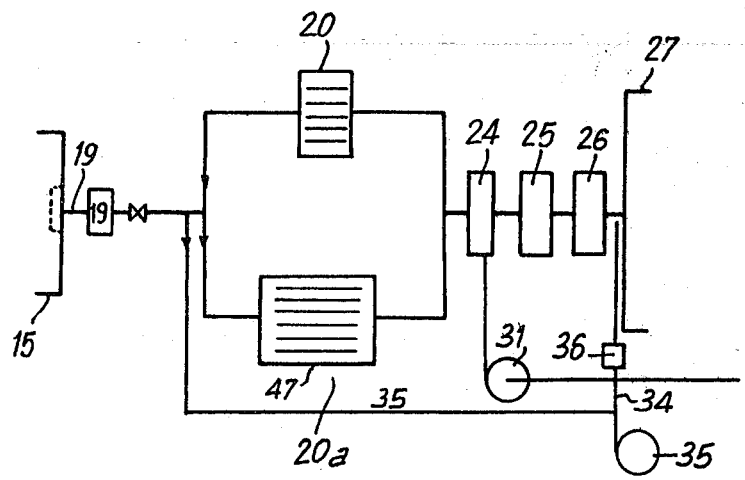

Various other features of the invention will become more apparent from the following detailed description of some embodiments thereof, reference being made to the accompanying drawings which are given as non limitative examples and wherein:

FIG. 1 is a diagram of a pre-purification device of a strongly soiled water which has to be purified, FIG. 2 is an elevation cross-sectional diagram of an embodiment of the purification device of the invention, FIG. 3 is a plan diagram seen from above and grouping the pre-purification and purification devices of FIGS. 1 and 2, FIG. 4 is a plan diagram of a detail of realization, FIG. 5 is an elevation cross-sectional view, partly diagrammatic, of a treatment unit which is an alternative embodiment of the device of FIG. 2 and provided for the purification of water under pressure, FIG. 6 is a diagrammatic transverse cross-sectional view of a part of the installation of FIG. 5, FIG. 7 is a sectional view of an other part of the installation of FIG. 5, FIG. 8 is a diagrammatic axial cross-sectional view of a member shown in FIG. 5, and FIG. 9 is a schematic transverse cross-sectional view of the member shown in FIG. 8.

FIG. 1, best understood in conjunction with FIG. 3, shows a part of the device which is used in combination with the device described hereafter with reference to FIG. 2 or with the device described with reference to FIG. 5 and following Figures, but which is only necessary for the treatment of particularly soiled waters containing solid, fat, forming or similar products.

A duct 1 brings the soiled waters to a first basin 2 forming a weir 2a leading to a collecting tank 3 for recovering floating objects, said tank being connected to a disintegrator 3a or any other recovery member.

Across the basin 2 is a sloping grid 4 preventing the passage of floating bodies of large size, but leaving a passage for small size objects towards a basin 5 also formed with a weir 5a leading to the collecting tank 3.

A very fine mesh grid 6 is also arranged in the basin 5 so that only the liquid products or the products of very small size may reach a basin 7 also formed with a weir 7a. Said basin 7 is a so-called balance-basin which regulates the quantities of water having to be treated.

The excess water is directed to a storage tank 8 (FIG. 3) from where it is brought back to a tank 15 by a pump 9 when the quantity of soiled waters arriving through the duct 1 is too small in volume.

Reference numeral 10 indicates a water-gate adapted for moving vertically, used for stopping the impurities possibly floating on the surface of basin 7 from where they can be recovered. The gate 10 is not always necessary.

A water-gate 14 which is adjustable in height delimits with the bottom of basin 7 a passage 14a regulating the quantity of water to be treated which is admitted in a tank 15. The tank 15 comprises level detector devices 11 and 12. The detector 11 controls the gate 14 and closes it when the level tends to come over that which is represented and at which the fat or floating bodies are evacuated through a duct 17 towards a basin 17a leading to recovery installations.

For isolating the fat bodies, the tank 15 is divided into two compartments by a wall 15a extending downwards almost to its bottom.

The level detector 12 controls a pump 9 which brings back soiled water from the storage tank 8 when the level becomes excessively low. The pricipitates eventually forming in chambers 16 and 18 of the tank 15 are discharged through a 15bis. Finally, the water is recovered behind a grid 18a by a duct 19 once it is free from bodies in suspension and the greater part of fat bodies.

The duct 19 comes to a circulation pump 19a followed by a non-return valve 19b (FIGS. 2 and 3) leading to an electrolytic treatment unit 20. The electrolytic treatment unit 20 may be formed in various ways but, as is shown in particular in FIGS. 8 and 9, it always comprises metallic electrodes 85 arranged within a cell housing 57 delimiting inlet and outlet distribution chambers 59, 59bis. Electrodes 85 are arranged into two distinct sets each connected to a pole of an electric source, preferably a d.c. source, but it can be in some cases a source of wavy current or of a current of other shape.

The electrolytic treatment unit comprises advantageously supporting combs 86 for the two sets of electrodes, said combs being connected to a cover 58 closing the cell housing 57 when clamped by means of stirrups 83 and a screw 84. This arrangement provides an easy exchange of electrodes when they are worn out.

An advantageous feature of the invention lies in that there is always used an odd number of electrodes, which avoids the flow of an interfering current due to the cell housing which may be metallic. Moreover, the homogeneity of the treatment is thereby improved. The treatment current flows through terminals 89.

Reference being still made to FIGS. 2 and 3, water which has flowed through the electrolytic treatment unit 20 is subjected, in chamber 59a following the electrodes 85 between which it has passed, to the beginning of a process of increase in size of the hydroxides formed by the emitted ions and also to an initiation of a flocculation process. Provisions are also made so that water which has just been subjected to an electrolysis is subjected immediately after to a degassing operation tending to separate the gas bubbles, particularly of hydrogen, from the flocculates just being formed. To this end and referring to the embodiment of FIGS. 2 and 3, the water coming from the electrolytic treatment unit is directed towards successive tanks 24, 25, and 26 arranged in cascade so that the flocculates which are growing are gently stirred and mechanically turned over from one tank to the other, thereby flavoring the release of the gas bubbles.

Discharge ducts 24a, 25a and 26a are provided at the bottom of each tank.

The degassing tanks 24, 25 and 26 communicate with a decanter indicated as a whole by reference numeral 27. Said decanter, the bottom of which is slanting, forms compartments 28, 29, 32 and 33 separated by walls extending alternately from top to bottom and from substantially bottom to substantially top so that the water has to follow a path which is substantially sinusoidal at a speed which is progressively slowing down.

To this effect, the compartment 28 is advantageously about from 1 to 1.3 tenths of the total capacity of the decanter, the compartment 29 from 1.25 to 1.80 tenths, the compartment 32 from 2.50 to 2.80 tenths and the compartment 33 from 3 to 4 tenths.

On the other hand, the first wall indicated by reference numeral 38 is in fact a so-called homogenization chamber which is a thin chamber in which the water flows in a laminar fashion from a distributing tube shown at 37 in FIG. 3, and this chamber is followed by a duct 39 extending beyond the wall 32a in order to form thereafter a weir 40, preferably of a small slant. The wall 29a extends of course in an opposite direction to the walls 38 and 32a.

Moreover, a wall 41, which extends only to about one third of the depth of the decanter, is provided between the weir 40 and the outlet of the decanter outlet, said operating through overflow towards a recovery chute 45.

A drawing-up duct 30 is placed in the decanter with its inlet at about one third from the bottom of the decanter. The drawing-up duct 30 is connected to a pump 31 leading to one of the degassing tanks, preferably the tank 24. In this way, the duct 30 recovers the still active flocculates which are reinjected in the water being treated and coming from the electrolytic battery; this greatly promotes the development of the flocculation.

A further drawing-up duct 34 opens in the compartment 33 at the downstream part of the latter and at some distance from the surface, for instance at about one third of its height, that is in a location where the water has become particularly clean. The drawing-up duct 34 is connected to a pump 35 the outlet of which leads through valves 22, 23 on the one hand towards the distributing tube 37 in the homogenization chamber delimited by the wall 38, and on the other hand towards the inlet of the electrolytic cell 20.

An oxygenator device 36 is placed between the pump 35 and the distributing tube 37. Thus, it is a well oxygenated water which is redirected to the weir 40 in the outlet compartment 33 of the decanter, the wall 41 preventing any eddy current at the level of the surface of the purified water flowing towards the recovery chute 45.

By acting on the water valves 22, 23, it is possible to use the pump 35 for sending clean water in the electrolytic cell 20 after having closed the valve 19b. Thus, it is possible to periodically clean the sets of electrodes battery and this cleaning operation may be combined with a modification of the current applied to the electrodes. The water may be maintained stationary and the current reversed several times.

In some cases, the water to be treated may need a more or less important ionic development, or its flow may vary and in particular may decrease relative to the maximum flow provided for the installation. Then, and as is shown in FIG. 4, it is advantageous to hydraulically place in parallel several groups of electrolytic treatment cells, some of which being eventually apart. It is then possible to use standard cells for installations of very different characteristics.

So far, the invention has been described with reference to an installation which has to operate in the open air and therefore atmospheric pressure.

But the invention may also be practiced in a similar way when the water flows under pressure and has to be protected against the atmosphere, which presents advantages in some cases, in particular for the treatment of radio-active waters or of waters containing products whose exhaust in the atmosphere might be disadvantageous.

FIGS. 5 to 7 show such an embodiment wherein the treatment cell or cells 20 are connected by a duct 60 to a primary degassing chamber 21 which is part of a decantation chamber 61. The duct 60 comes tangentially into the chamber 21 as shown in FIG. 7, so that the water where flocculation begins to grow is subjected to a gyratory effect stirringly promoting the separation of the bubbles from the flocculates being just formed so that the gas bubbles climb up to the top of the primary degassing chamber which is provided with a degassing valve 78. The degassing chamber 21 is mounted above the decantation barrel.

A tranquilisation cylinder 62 emerges into the primary degassing chamber. The cylinder 62 has an open top arranged at some distance above inlet of the duct 60 so that the water flows first in the annular space separating the cylinder 62 from the inner wall of the chamber 61, then penetrates into the chamber 61. The bottom of the cylinder 62 is in communication with an annular duct 62a concentric with a duct 63 coming into a chamber 64.

The passage cross-sectional area of the annular duct 62a is smaller than that of the cylinder 62, and that of the duct 63 is still smaller than that of the annular duct 62a so that the speed of the water is accelerated in said ducts at the outlet the cylinder 62 in which the flocculation has already substantially been developed following the degassing step. The acceleration which is produced promotes agglomeration of the flocculates together and said flocculates as well as the water driving them away are slowed down in a chamber 64 whose passage cross-sectional area is important relative to that of duct 63.

The water is then brought to pass through chambers 65, 68 and 69 separated by baffle-walls, the successive chambers having an increasing volume so that the flowing speed is progressively slowed down. Degassing valves 78, 79, 80 and 81 are provided at the top of the various chambers.

The flocculate so formed is discharged on the one hand from the annular duct 62a via a tube 75 provided with a valve 75a and, on the other hand, from the bottom of the decantation chamber by ducts 76, 77 provided with a valve 76a, 77a.

As in the example of FIGS. 1-4, a drawing-up duct 66 is provided for instance in the chamber 65 and emerges at a distance from the bottom of the decanter so as to draw up the flocculate developing therein and to reinject it through the pump 67 in the primary degassing chamber in which it is introduced tangentially as is shown in FIG. 7 to be brought in the stream of liquid coming from the electrolytic cell 20. The purified water is then found in chamber 69 where there is provided, substantially at $\frac{2}{3}$ of the height of said chamber, a water tapping 70 leading to a pump 71 the delivery of which is connected to an oxygenation apparatus 72 connected itself to a distributor ring 73.

The distributor ring 73 is arranged in the chamber 69 and is formed with holes 74 for the passage of the oxygenated water brought back in the decanter.

As in the example of FIGS. 1-4, a set of valves 71a is provided for the delivery (through a pipe 70') of purified water towards the inlet of the electrolytic cell so as to clean it. Thus, the same functions are provided as those described hereabove with reference to the open air installation of FIG. 2.

The treated water is finally discharged through duct 82 at top of the chamber 69.

The hereabove described apparatus is provided for treating waters from very different origins, for instance sullage, industrial reject waters, whatever their turbidity or hydrotimetric degree. The metal of the electrodes of the electrolytic cells is a function of the particular nature of the treatment to be carried out. For instance one uses advantageously iron electrodes for waters containing metallic salts, aluminum electrodes for waters where a flocculation should develop quickly, or copper electrodes where a more important bactericidal effect is required in addition. Electrodes of other metal or alloy may of course also be used without departing from the scope of the invention, their nature, number, in-between distance depending only on the particular case in consideration and the voltage and intensity of the current depending mainly on the nature of the waters to be treated and the results aimed at.

It has been stated hereabove that the invention is particularly provided for treating waters from industrial rejects containing metallic salts and particularly chromates. Tests have been carried out in particular with waters containing hexavalent chromium which is toxic. It has then been found that the hexavalent ions $Cr^{+6}$ which are toxic could easily, in the apparatus of the invention, be transformed into trivalent ions $Cr^{+3}$ which are neutral and combine with the water ions OH for forming chromium hydroxide $Cr(OH)_3$ which flocculates and may be retained in the decanter; this is obtained particularly with iron electrodes. Although this may vary in a large measure, it has been established that particularly satisfactory results are obtained when the decanter volume is about 50% larger than the hourly volume of the water to be treated and at least equal to the hourly volume.

Tests carried out by adjusting the electrolytic cell or cells have proved that it was possible to retain completely waters loaded with chromate as well as other metals such as cesium, zirconium, uranium, . . .

Although not represented, various modifications may be effected on the described devices. In particular, the primary decantation chamber may be provided with baffles which are horizontal or preferably slightly slanting, thereby compelling the water and the flocculates just been formed to follow a perturbed path which rotates said flocculates about themselves, thereby making easier their separation from the gas bubbles which are driven away and which are due to the electrolysis. In this case, it is no more necessary that the water be subjected to a gyratory movement as is shown in FIG. 5.

Likewise, in some embodiments, it is possible to inject upstream as well as downstream of the electrolytic cell or cells various chemical ingredients likely to promote the growth of the flocculates or to act on the turbidity or hardness of the water, for example a polyelectrolyte.

The invention is not limited to the embodiments shown and described in detail, and many modifications may be carried out without departing from the scope of said invention.

I claim:
1. A method for purifying liquids by means of oligodynamy, consisting essentially of:
   regularly passing the totality of the liquids between electrically supplied metal electrodes, whereby the liquids are treated and metal ions are homogeneously dissipated in the treated liquids to provide formation of flocculates;
   subjecting the treated liquid to a physical treatment which causes a substantial quantity of gas bubbles to separate from the flocculates just being formed in the liquid;
   removing the separated air bubbles; and
   separating the flocculate and evacuating purified liquids.

2. A method in accordance with claim 1 further including the step of recovering at least a part of the flocculate and reintroducing the recovered flocculate into the treated liquids.

3. A method in accordance with claim 2 wherein the recovered flocculate is reintroduced into the treated liquids prior to the completion of said step of separating gas bubbles.

4. A method according to one of claims 1 or 3, wherein said step of separating and removing gas bubbles is made in a degassing vessel comprising a succession of tanks or basins, said liquids being then carried into a decantation tank with multiple compartments and increasing volumes comprising exhaust means for decanted flocculates, exhaust means for purified liquids and exhaust means for gases.

5. A method according to one of claims 1 or 3, wherein said step of separating and removing gas bubbles is made in a degassing vessel comprising a chamber in which the liquids are driven in a gyratory movement, said liquids being then carried into the decantation tank with multiple compartments and increasing volumes comprising exhaust means for decanted flocculates, exhaust means for purified liquids and exhaust means for gases.

6. A method according to claim 5, wherein the degassing vessel is connected to an air-tight decantation chamber, the metal electrodes being connected to the degassing vessel via an air-tight duct, and wherein degassing valves are provided at least in relation with the degassing chamber.

7. A method for purifying liquids by means of oligodynamy, consisting essentially of the steps of:
regularly passing the totality of the liquids between electrically supplied metal electrodes, whereby the liquids are treated and metal ions are homogeneously dissipated in the treated liquids to provide formation of flocculate;
separating the flocculate and reintroducing at least a part thereof into the treated liquids; and
evacuating purified liquids.

8. A method in accordance with claim 7 further including the step, immediately after said passing step, of separating a substantial quantity of the gas bubbles in the liquid from the flocculates just being formed.

9. A method according to one of claims 1 or 7, further including the step of leaving the flocculate to grow for a time longer than one hour before separating it from the liquids.

10. A method in accordance with claim 9, wherein the flocculate is left to grow for a time of the order of one and a half hours.

11. A method according to one of claims 1 or 7, further including the step of adding oxygen to the liquids separated from the flocculate.

12. A method according to one of claims 1 or 7, wherein the oligodynamically active metal electrodes are electrically adjusted as a function, on the one hand, of the nature of the metals forming them and, on the other hand, of the liquids to be treated, whereby the metal of the electrodes reacts with the metals and metallic salts in the treated liquids.

13. A method according to one of claims 1 or 7, further including the step of adding to the oligodynamically treated liquids chemical ingredients for promoting growth fo the flocculate and acting on turbidity or hardness of the liquids.

14. A method according to one of claims 1 or 7, wherein the step of passing the liquids between oligodynamically active metal electrodes is made through an odd number of electrodes.

15. A method according to one of claims 1 or 7, wherein the step of passing the liquids between oligodynamically active metal electrodes is made through at least two sets of electrodes.

16. A method according to one of claims 1 or 7, wherein the step of passing the liquids between oligodynamically active metal electrodes is made by using electrodes of iron.

* * * * *

UNITED STATES PATENT AND TRADEMARK OFFICE
CERTIFICATE OF CORRECTION

PATENT NO. : 4,304,648
DATED : December 8, 1981
INVENTOR(S) : Jean L. VELLAS

It is certified that error appears in the above-identified patent and that said Letters Patent are hereby corrected as shown below:

Column 2, line 7, delete "forming" and insert --foaming--
        line 46, before "15bis" insert --duct--

Column 4, line 14, delete "battery"
        line 29, insert --at-- before "atmospheric"

Signed and Sealed this

First Day of June 1982

[SEAL]

Attest:

GERALD J. MOSSINGHOFF

Attesting Officer     Commissioner of Patents and Trademarks